Figure 5:
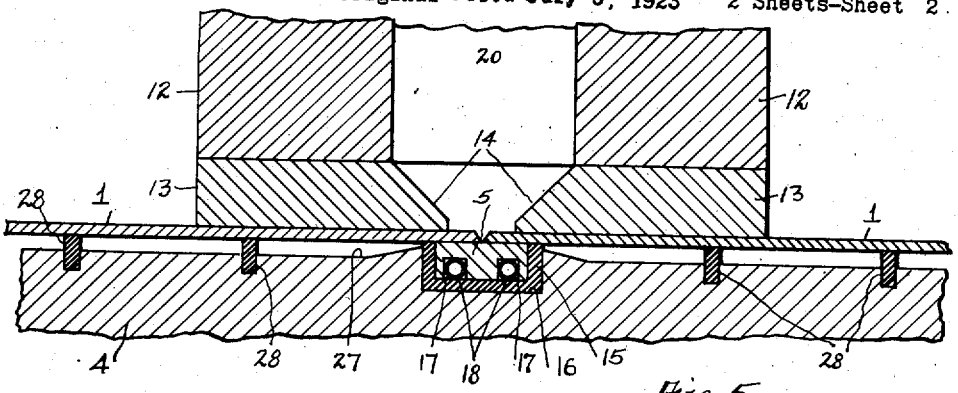

J. F. LINCOLN
Oct. 6, 1931. ARC WELDING Re. 18,221
Original Filed July 3, 1923 2 Sheets-Sheet 1
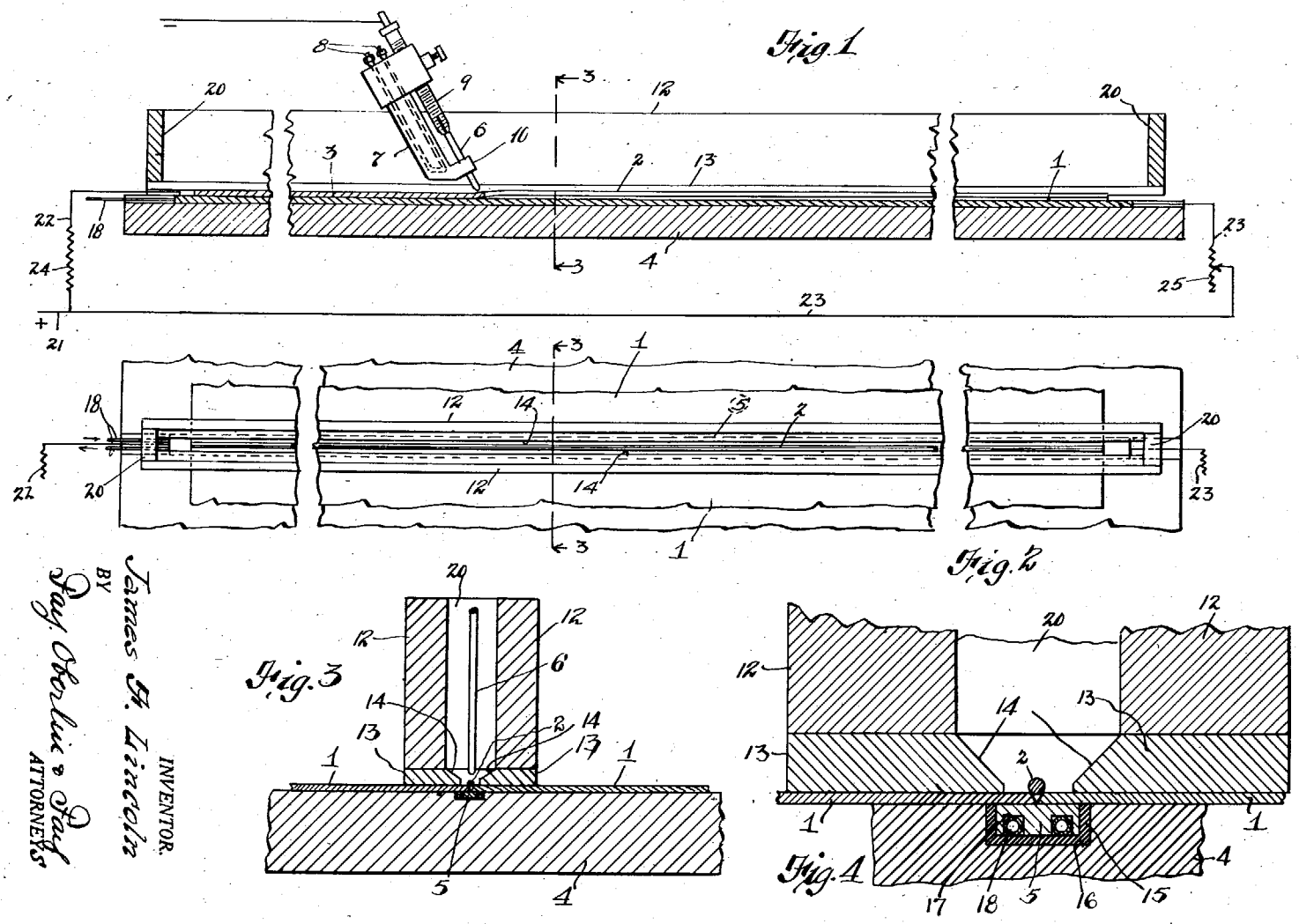
INVENTOR.
James F. Lincoln
BY
Pay, Oberlin & Paul
ATTORNEYS Oct. 6, 1931.

J. F. LINCOLN

ARC WELDING

Re. 18,221

Original Filed July 3, 1923 2 Sheets-Sheet 2

INVENTOR.
James F. Lincoln
BY
Fay Oberlin & Fay
ATTORNEYS

Reissued Oct. 6, 1931 Re. 18,221

UNITED STATES PATENT OFFICE

JAMES F. LINCOLN, OF EAST CLEVELAND, OHIO, ASSIGNOR TO THE LINCOLN ELECTRIC COMPANY, OF CLEVELAND, OHIO, A CORPORATION OF OHIO

ARC WELDING

Original No. 1,774,023, dated August 26, 1930, Serial No. 649,246, filed July 3, 1923. Application for reissue filed June 16, 1931. Serial No. 544,889.

The present improvements have more particular regard to methods of electric welding and of working metal by electricity in general, wherein an electric arc is struck between the part or parts to be fused and a carbon electrode that is moved relatively to such parts to be fused and a carbon electrode that is moved relatively to such parts so as to cause the arc to transverse the work. One serious difficulty that has always been encountered in such arc welding is the tendency of the arc to lag or "stick" as well as to shift irregularly from one point to another on the work. The resultant weld produced by such arc will be correspondingly variable and hence unsatisfactory in character.

As a result of an extended investigation, I believe I have ascertained the major factors which contribute to such behavior of the arc. One of these, and perhaps the strongest, is the tendency of the arc to go to the hot spot on the work and not leave that hot spot until the arc is attenuated very much longer than would be the distance to the nearest cold spot. This action is well known and as a result thereof if the welding is one in which the metal is not rendered molten entirely through or at least to a considerable depth, the arc will be rather wild and will tend to drag. In other words, the arc stream will lengthen out back of the arc away from the direction in which it is traveling relatively to the work. In addition, however, to the foregoing, there are other magnetic conditions, the importance of which in their behavior of the arc has not heretofore been appreciated.

One of these magnetic conditions is that produced by the incoming current through the work where such current flow, as is ordinarily the case, requires to turn at approximately right angle to go into the electrode, it being understood that the latter is necessarily connected with the negative side and such work with the positive side of the electric current source. Another such magnetic condition is that due to the flux set up in the metal of the work itself by the current thus flowing herethrough to the electrode holder. Still another such condition is that due to the flux which is set up in the clamps employed to retain the work in place where I have found it to be desirable, for other reasons, that the work should be firmly clamped to a bed or equivalent support.

The effect of these various conditions on the arc, as well as their interaction, will be hereinafter more fully described in connection with the description of the various corrective measures which I have devised for neutralizing or controlling the effects produced. The general object of the improvements thus made, it may be stated, is to control the direction of "blow" of the arc so as to cause the same to incline in any desired direction from the end of the electrode, for example, forwardly or rearwardly or laterally to either side, having regard to the direction of travel of the electrode relatively to the work. A further object is to obtain a smooth, even action of the arc so as to produce a more nearly perfect weld.

To the accomplishment of the foregoing and related ends, the invention, then, consists of the steps and means hereinafter fully described and particularly pointed out in the claims, the annexed drawings and the following description setting forth in detail one approved method of and mechanism for carrying out the invention, such disclosed means, however, constituting but one of the various ways in which the principle of the invention may be used.

In said annexed drawings:—

Figure 6:
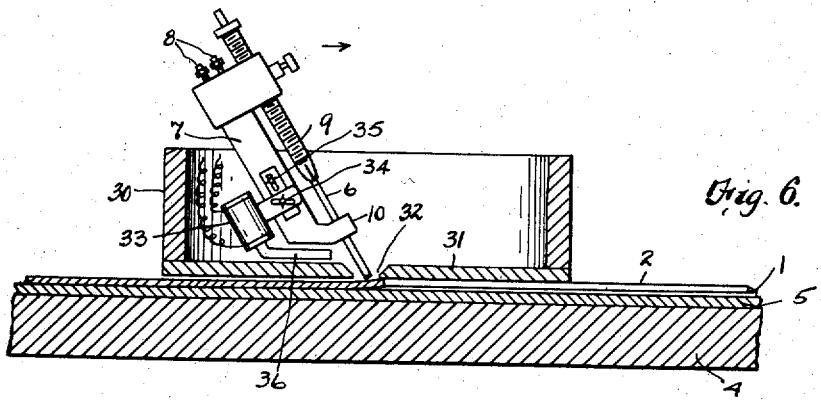
Figure 7:
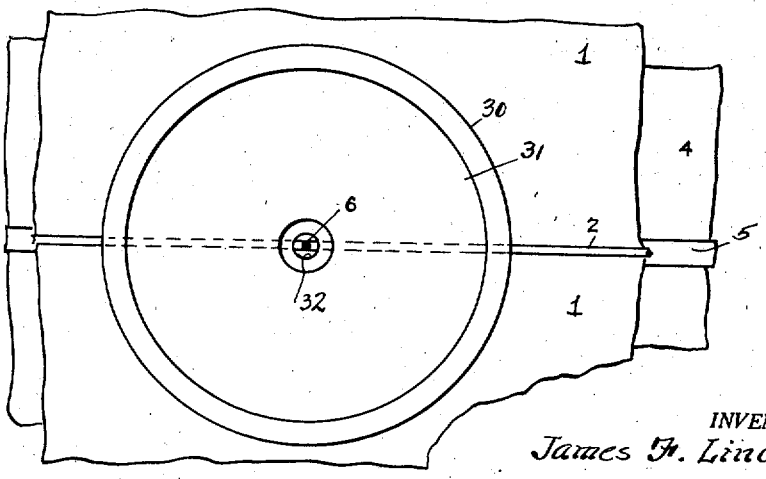

Fig. 1 is a more or less diagrammatic representation of an arc welding mechanism or apparatus embodying my present improvements and adapted to operate in accordance with my present improved method, such apparatus being shown as applied to the welding of a longitudinally extending seam between the edges of two juxtaposed plates or sheets of metal; Fig. 2 is a plan view of the same; Fig. 3 is a transverse section thereof, the plane of the section being indicated by the lines 3—3, Figs. 1 and 2; Fig. 4 is a broken transverse view, similar to that of Fig. 3, but showing the parts therein appearing on a larger, approximately full size, scale; Fig. 5 is a view similar to Fig. 4 but showing a modification; and Figs. 6 and 7 are a plan and longitudinal section of still another modification.

As indicated in the arrangement illustrated in the several figures of the drawings, the work is shown as consisting of two sheets, 1, 1, which are disposed with the abutting edges thereof, that are to be joined together, in substantially abutting relation. Sufficient space, however, may be left between such edges or the latter may be slightly beveled so that a filler strip or wire 2 may be inserted therebetween or such strip may be placed so as simply to rest upon the seam. This element 2 will usually be of the same material, i. e. iron or steel, as the metal of the sheets, but may if desired contain special alloying constituents or even be of a different metal entirely, so far as the pactice of the present invention is concerned. The object of the illustrated operation, it will be understood, is to melt down such element 2 and interfuse the same with the edges of the sheets 1, 1, so that the resultant seam 3, as shown at the lefthand end of Figs. 1 and 2, will be of substantially the same thickness as the sheets and possess a strength and ductility equal to, if not greater than, that possessed by such sheets.

As shown, the sheets 1 with such filler element 2 interposed between their abutting edges are preferably supported on a bed or anvil 4 which will preferably be of steel except for a strip 5 of copper which is disposed directly beneath the seam, and thus below the line of the weld, such strip serving a particular and important function as will be presently explained. The welding, as previously indicated, is accomplished by means of an electric arc, a carbon electrode 6 being employed, and the welding circuit, including such carbon, the filler element 2 and the bed or anvil 4 or rather the strip 5 which, as aforesaid, forms a part thereof. The holder 7 for such electrode, shown in side elevation in Fig. 1, is of a special design that forms no part of the present invention, such holder being characterized, among other things, by having connections 8 for circulating a cooling liquid through the body thereof. It will be observed, however, that while the electrode is adjustably supported in the holder-body by means of an adjustable chuck 9, such body is formed at its extreme lower end with a projecting portion 10 through which the electrode passes and wherewith it is in electrical contact so that the current is required to pass only through a very short section of the electrode, viz, that portion which extends beyond the projection 10 in question, the current path from this point on being through the body of the holder which is of copper or equivalent conducting material.

For the purpose of clamping the sheets 1, 1, onto the supporting bed or anvil 4, I employ two bars 12, 12, that are laid on the work, one on each side of the seam or joint to be welded. These bars are of such weight in themselves, or such additional pressure may be applied thereto, as to cause them to retain the edges of the sheets that constitute the work securely in place upon such bed and they will be of metal or equivalent conductive material. Specifically I make the main body of said bars of steel, each bar being provided along its lower edge with a base 13 in the form of a strip of copper or equivalent metal of relatively high heat as well as electrical conductivity that is integrally united with the steel bar as by welding to such steel portion of such bar 12. The dimensions of the bars 12 in cross-section may vary, but preferably they will be of relatively greater height than width, as shown in Fig. 3, so as to laterally enclose the electrode 6 and the arc that is formed between the latter and the work when the operation of welding is in progress. It will further be noted that the bases 13 of said bars are respectively formed with inwardly extending portions or toes 14 that may be approached closely to either side of the seam or line of weld and in such position overlie the corresponding edges of the copper strip 5 in bed 4; also that the upper corners of the juxtaposed edges of said bases 13 are cut away or beveled.

Further note should be made of the fact that due to the construction of these bars, as well as their location in close proximity to the path of travel of the electrode, or rather of the arc, any tendency on the part of such arc to wander laterally will be effectually overcome. In other words, the material of the bars being of metal and the bases thereof being furthermore of copper, or equivalent high heat conductivity, the arc once struck preferentially stays by the pool of molten metal or crater thereby formed in the work, and as the electrode is moved along the line of the weld and the arc becomes attenuated, it will more readily follow such line, where the latter is guarded, so to speak, on either side by a bar of the character described. Such bars, and particularly the bases thereof, are not apt to become heated, even in the proximity of the arc, to the degree that the portion of the filler strip just forward of the arc and the adjacent edge portions of sheets 1 do. Accordingly, the arc is constrained to move in the desired direction instead of jumping to one side or the other. The inwardly directed portions 14 of the copper bases 13 furthermore serve to confine the overflow of molten metal resulting from the interfusion of the filler strip or wire 2 with the abutting edges of the plate 1 and so assist in forming a smooth seam with straight edges throughout its length.

The upper face of said strip 5, as best shown in Fig. 4, lies flush with the upper surface of bed 4 and, as also shown in the same figure, said strip is completely insulated from the bed by means of a layer of suitable insulating material 15 interposed between the same and the bottom and walls of the channel 16 formed in said bed to receive the strip. I also consider it desirable, although not necessarily essential, to provide means for cooling this strip and to this end two channels 17 are cut in the underside thereof and tubes 18, preferably of copper or brass, are laid in such channels, such tubes being connected across at one end of the strip and their ends projecting at their other end so as to afford an external connection for circulating therethrough a stream of water or suitable cooling liquid.

As shown in Figs. 1 and 2, the bars 12 are longer than the seam or line of weld; in other words, they are adapted to extend at their respective ends some distance beyond the adjacent sides or outer edges of the sheets 1, and short blocks 20 of the same material, i. e. steel, as said bars 12 are fitted between such ends thereof. Preferably blocks 20, which are approximately of the same cross-section as the bars, will be permanently attached each to one of said bars and merely pressed against the other or in some suitable way detachably held thereagainst so as to permit of the ready separation of the two bars in setting up and disassembling the mechanism. As a result of the construction just described, a magnetic short circuit is provided which will give an easy path beyond the farthest point at which the welding may be done.

With the same object in view, viz., to provide a magnetic short circuit in the steel bed 4, it will be observed that the so-called fire strip 5 stops short of the end of such bed, preferably a trifle within the ends of the space defined by such blocks 20 thus attached to the clamp bars 12. It will further be noted (see Fig. 1) that the positive lead 21, through which the incoming current is supplied to said bed, is divided into two branches 22 and 23 that are respectively connected with opposite ends of said fire strip 5. Moreover, while a fixed resistance 24 is interposed in such first branch, a variable, i. e. adjustable, resistance or rheostat 25 is interposed in said branch 23. These resistances are of such character that they may either be balanced, thus causing the incoming current to enter the fire strip in approximately equal amounts at the respective ends of such strip, or by cutting in resistance or cutting it out by proper manipulation of rheostat 25, such current may be caused to flow in preponderating amount to one end or the other of such strip as desired.

It will further be noted that at all times, due to the fact that the incoming current reaches the arc by way of the path defined by said fire strip, it is caused to turn at substantially a right angle at the point directly beneath the electrode 6 or in other words at the point where the arc is formed, this irrespective of the position of the electrode longitudinally of the work. The magnetic condition, due to the incoming current, thus becomes a known factor and can be dealt with accordingly. At the same time by regulating the amount of current supplied to the respective ends of the strip 5, the increase in distance between the arc and either end and the corresponding decrease in distance between such arc and the other end, as the arc advances along the work, may be balanced so that no change in magnetic condition will occur due to variation in the flow of current to the arc, but this condition likewise can be maintained substantially constant by simply adjusting rheostat 25.

In the absence of blocks 20 bridging the ends of clamp bars 12, the magnetic effect of such bars is such that the flow of the arc will be toward the middle of said bars when the arc approaches either end. In other words, the arc will tend to blow forwardly when it is located near one end of the space between bars 12 and rearwardly at the opposite end of such space. By means, however, of the magnetic short circuit provided by the interposition of the blocks 20, an easy path is provided for the magnetic flux beyond points at which the welding is being done. Otherwise stated, the clamp bars, together with such bridge blocks or bars, afford a continuous iron path entirely around the arc at all times, the bridge bars being located a sufficient distance beyond the respective limits of travel of the arc to avoid any tendency for constriction of such magnetic flux.

Under the conditions thus existing in my improved mechanism, it will be seen that if the current enters from both ends equally, or in predetermined relative amounts, the arc will have very little tendency to blow in either direction, if it is operating properly. The effect of the "hot spot" as a factor accordingly becomes negligible since this can be taken care of by operating the arc at a proper speed. The direction of the incoming current can of course be controlled by means of the divided connection from the positive lead to the fire strip 5, one branch of such lead having a rheostat therein.

It is to be remembered that the incoming current is just as potent in tending to distort the current out of the path coming to the electrode as it is tending to distort the arc. Therefore, if the arc is being distorted, there is just as much pressure trying to distort the current. In my improved mechanism, however, matters are so arranged specifically by electrically insulating the fire strip from the bed, that it is impossible for the current to be distorted out of a certain set path which will give the results desired, so far as the blow of the arc is concerned and the latter will not vary because of the reaction of the arc on the incoming current.

Where the work consisting of sheets 1, for example, as shown in Figs. 3 and 4, contacts in part with the bed 4, there will of course be some tendency for the current to flow through the work beyond the limits defined by the fire strip 5 and the overlapping toes 14 of the clamp-bar bases 13. Such straying of the current may, if found desirable, be substantially entirely eliminated by the modification in construction shown in Fig. 5. Here it will be seen that the upper surface of the bed 4 is cut away on either side of the fire strip 5 or rather of the channel 16 wherein such strip is embedded so as to leave a substantial clearance space 27. Where the sheets 1 are of such extent that they require to be supported beyond their edge portions which rest on the fire strip 5, this may be accomplished by inserting ribs 28 of insulating material in the bed 4, such ribs preferably running longitudinally of the bed, i. e. parallel with the fire strip.

In place of so constructing the clamp bars 12 as to constitute thereof a closed circuit for the magnetic flux set up by the arc, such bars resting stationarily on the work but extending beyond the respective limits of travel of the arc so that the magnetic conditions due to the flux set up in such clamp bars will not vary within such limits of travel, I may enclose the arc with a movable magnetic damper that is carried along with the arc. In Fig. 6 a form of mechanism incorporating such a movable magnetic damper 30 is illustrated, the other parts of the apparatus remaining substantially the same as before. Such damper consists essentially of an open steel frame of general annular form slidably or otherwise movably supported upon the bed 4. If desired bars similar to bars 12 may also be employed but these will then be limited in function to the clamping action previously referred to. Such movable magnetic damper will in any event render more or less negative the effect that such bars, or other corresponding parts of the apparatus, would otherwise have as a pathway for the flux set up by the passage of the current through the arc. A copper plate 31, corresponding in function to the bases 13 of the bars 12 in the previously described form of apparatus, closes the bottom of the frame 30, save for an approximately central opening 32 through which the arc is struck.

If desired to add a positive controlling factor to the magnetic conditions surrounding the arc, I may employ a solenoid 33 preferably disposed as shown in Fig. 6; i. e. said solenoid is adjustably attached to the electrode holder 7 by means of clamps 34 and 35 so as to permit the angularly projecting armature 36 to be brought into necessary proximity to the arc. A suitable current being thereupon passed through said solenoid, obviously an independent magnetic field may be created to hold or deflect the arc as may be desired.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. In metal working by electricity, the steps which consist in establishing an arc between the work and a suitable electrode, relatively moving such work and electrode to cause the latter to follow the line to be welded, and surrounding such arc with a closed circuit for flux set up by flow of current through such arc.

2. In metal working by electricity, the steps which consist in establishing an arc between the work and a suitable electrode, relatively moving such work and electrode to cause the latter to follow the line to be welded, and surrounding such arc with a relatively stationary closed magnetic circuit for flux set up by flow of current through such arc.

3. In metal working by electricity, the steps which consist in establishing an arc between the work and a suitable electrode, relatively moving such work and electrode to cause the latter to follow the line to be welded, and supplying the incoming current to the arc through the work at opposite ends of the path traversed thereby.

4. In metal working by electricity, the steps which consist in establishing an arc between the work and a suitable electrode, relatively moving such work and electrode to cause the latter to follow the line to be welded, supplying the incoming current to the arc through the work at opposite ends of the path traversed thereby, and varying the current thus supplied so as substantially to balance the magnetic effect of the flow thereof from such ends, respectively.

5. In metal working by electricity, the steps which consist in establishing an arc between the work and a suitable electrode, relatively moving such work and electrode to cause the latter to follow the line to be welded, surrounding such arc with a closed circuit for flux set up by flow of circuit through such arc, and supplying the incoming current to the arc through the work at opposite ends of the path traversed thereby.

6. In metal working by electricity, the steps which consist in establishing an arc between the work and a suitable electrode, relatively moving such work and electrode to cause the latter to follow the line to be welded, surrounding such arc with a closed circuit for flux set up by flow of current through such arc, supplying the incoming current to the arc through the work at opposite ends of the path traversed thereby, and varying the current thus supplied so as substantially to balance the magnetic effect of the flow thereof from such ends, respectively.

7. In arc-welding mechanism, the combination of a suitable bed for supporting the work, a strip of conductive material carried by but insulated from said bed, said strip being adapted to contact with the portion of the work to be welded, and means for supplying the incoming current connected to said strip.

8. In arc-welding mechanism, the combination of a suitable bed for supporting the work, a strip of conductive material carried by but insulated from said bed, said strip being adapted to contact with the portion of the work to be welded, and a branched lead for supplying the incoming current to said strip, the branches of said lead being connected with the respective ends of said strip.

9. In arc-welding mechanism, the combination of a suitable bed for supporting the work, a strip of conductive material carried by but insulated from said bed, said strip being adapted to contact with the portion of the work to be welded, a branched lead for supplying the incoming current to said strip, the branches of said lead being connected with the respective ends of said strip, and means adapted to vary the flow of current through such branches.

10. In arc-welding mechanism, the combination of a suitable bed for supporting the work, a strip of conductive material carried by but insulated from said bed, said strip being adapted to contact with the portion of the work to be welded, a branched lead for supplying the incoming current to said strip, the branches of said lead being connected with the respective ends of said strip, and an adjustable rheostat in one such branch.

11. In arc-welding mechanism, the combination of a bed of steel for supporting the work, a copper strip carried by but insulated from said bed, said strip being adapted to contact with the portion of the work to be welded and terminating short of said bed at each end, and means for supplying the incoming current to said strip.

12. In arc-welding mechanism, the combination of a bed of steel for supporting the work, a copper strip carried by but insulated from said bed, said strip being adapted to contact with the portion of the work to be welded and terminating short of said bed at each end, liquid circulating means associated with said strip for cooling same, and means for supplying the incoming current to said strip.

13. In arc-welding mechanism, the combination of a bed of steel for supporting the work, a copper strip carried by but insulated from said bed, said strip being adapted to contact with the portion of the work to be welded and terminating short of said bed at each end, elements of insulating material on each side of said strip adapted to contact with the work for the purpose of supporting the same, and means for supplying the incoming current to said strip.

14. In arc-welding mechanism, the combination of a suitable bed for supporting the work, an electrode and holder therefor movable relatively to said bed in a longitudinal direction, and means constituting a closed magnetic circuit spaced from but disposed to surround the arc between the work and said electrode throughout the path of travel of the latter.

15. In arc-welding mechanism, the combination of a suitable bed for supporting the work, an electrode and holder therefor movable relatively to said bed in a longitudinal direction, two bars disposed one on each side of the path of travel of said electrode and adapted to rest on the work to hold the latter in place, and blocks connecting the corresponding ends of said bars and forming in conjunction therewith a closed magnetic circuit.

16. In arc-welding mechanism, the combination of a suitable bed for supporting the work, an electrode and holder therefor movable relatively to said bed in a longitudinal direction, two bars disposed one on each side of the path of travel of said electrode and adapted to rest on the work to hold the latter in place, and blocks detachably connecting the corresponding ends of said bars and forming in conjunction therewith a closed magnetic circuit.

17. In arc-welding mechanism, the combination of a suitable bed for supporting the work, an electrode and holder therefor movable relatively to said bed in a longitudinal direction, two steel bars disposed one on each side of the path of travel of said electrode and adapted to rest on the work to hold the latter in place, the ends of said bars extending beyond the limit of travel of said electrode in each direction, and blocks of steel connecting the corresponding ends of said bars and forming in conjunction therewith a closed magnetic circuit.

18. In arc-welding mechanism, the combination of a suitable bed for supporting the work, an electrode and holder therefor movable relatively to said bed in a longitudinal direction, two steel bars disposed one on each side of the path of travel of said electrode and adapted to rest on the work to hold the latter in place, said bars having copper bases for contacting with the work, and a copper strip carried by but insulated from said bed, said strip being adapted to contact with the work on the opposite side from said bar-bases.

19. In arc-welding mechanism, the combination of a suitable bed for supporting the work, an electrode and holder therefor movable relatively to said bed in a longitudinal direction, two steel bars disposed one on each side of the path of travel of said electrode and adapted to rest on the work to hold the latter in place, said bars having copper bases for contacting with the work, and a copper strip carried by but insulated from said bed, said strip being adapted to contact with the work on the opposite side from said bar bases and the latter being formed with laterally projecting toes adapted to overlie said strip.

20. In arc-welding mechanism, the combination of a suitable bed for supporting the work, an electrode and holder therefor movable relatively to said bed in a longitudinal direction, and two strips of material having relatively high heat conductivity disposed one on each side of the path of travel of said electrode and adapted to contact with the work.

21. In arc-welding mechanism, the combination of a suitable bed for supporting the work, an electrode and holder therefor movable relatively to said bed in a longitudinal direction, and two copper strips disposed one on each side of the path of travel of said electrode and adapted to contact with the work.

22. In arc-welding mechanism, the combination of a suitable bed for supporting the work, an electrode and holder therefor movable relatively to said bed in a longitudinal direction, two copper strips disposed one on each side of the path of travel of said electrode and adapted to contact with the work, and means connected with said strips for pressing the same thus to the work.

23. In arc-welding mechanism, the combination of a suitable bed for supporting the work, an electrode and holder therefore movable relatively to said bed in a longitudinal direction, two copper strips disposed one on each side of the path of travel of said electrode and adapted to contact with the work, and rigid bars mounted on said strips respectively for pressing the same thus to the work.

24. In arc-welding mechanism, the combination of a suitable bed for supporting the work, an electrode and holder therefor movable relatively to said bed in a longitudinal direction, two copper strips disposed one on each side of the path of travel of said electrode and adapted to contact with the work, and rigid steel bars mounted on said strips respectively for pressing the same thus to the work.

25. In arc-welding mechanism, the combination of a suitable bed for supporting the work, an electrode and holder therefor movable relatively to said bed in a longitudinal direction, two copper strips disposed one on each side of the path of travel of said electrode and adapted to contact with the work, and rigid steel bars mounted on said strips respectively for pressing the same thus to the work, said bars being connected at their ends to form a closed magnetic circuit.

26. In arc-welding mechanism, the combination of a suitable bed for supporting the work, an electrode and holder therefor movable relatively to said bed in a longitudinal direction, two copper strips disposed one on each side of the path of travel of said electrode and adapted to contact with the work, and another copper strip carried by but insulated from said bed, said last-named strip being adapted to contact with the work on the opposite side from the two first-named strips.

27. In arc-welding mechanism, the combination of a suitable bed for supporting the work, an electrode and holder therefor movable relatively to said bed in a longitudinal direction, two copper strips disposed one on each side of the path of travel of said electrode and adapted to contact with the work, and another copper strip carried by but insulated from said bed, said last-named strip being adapted to contact with the work on the opposite side from the two first-named strips and the juxtaposed edges of said first-named strips overlying said last named strip.

28. In arc-welding mechanism, the combination of a suitable bed for supporting the work, an electrode and holder therefor movable relatively to said bed in a longitudinal direction, two copper strips disposed one on each side of the path of travel of said electrode and adapted to contact with the work, and another copper strip carried by but insulated from said bed, said last-named strip being adapted to contact with the work on the opposite side from the two first-named strips and the juxtaposed edges of said first-named strips overlying said last named strip and having their upper corners beveled.

29. A work-clamping device for use in arc welding, comprising a strip of material having a relatively high heat conductivity designed to contact with the work alongside the line being welded and a bar mounted on said strip for pressing the same to such work.

30. A work-clamping device for use in arc-welding comprising a copper strip designed to contact with the work alongside the line being welded, and a bar mounted on said strip for pressing the same to such work.

31. A work-clamping device for use in arc-welding comprising a copper strip designed to contact with the work alongside the line beng welded, and a bar mounted on said strip for pressing the same to such work, said strip projecting laterally beyond said bar.

32. A work-clamping device for use in arc-welding comprising a copper strip designed to contact with the work alongside the line being welded, and a bar mounted on said strip for pressing the same to such work, said strip projecting laterally beyond said bar and the upper corner of its projecting edge being beveled.

33. A work-clamping device for use in arc-welding, comprising a steel bar provided with a base on the edge designed to contact with the work, such base being composed of a metal having a relatively high heat conductivity.

34. A work-clamping device for use in arc-welding, comprising a steel bar provided with a copper base on the edge designed to contact with the work.

35. A work-clamping device for use in arc-welding, comprising a steel bar provided with a copper base on the edge designed to contact with the work, such base being formed with a laterally projecting toe.

36. A work-clamping device for use in arc-welding, comprising a steel bar provided with a copper base on the edge designed to contact with the work, such base being formed with a laterally projecting toe beveled on its upper side.

37. A work-supporting bed for use in arc-welding, comprising a bed, proper, of steel, and a copper strip, carried by but insulated from said bed, wherewith the work may directly contact.

38. In arc-welding mechanism, the combination of a bed for supporting the work, an electrode and holder therefor movable relatively to said bed in a longitudinal direction, two strips of metal having a relatively high heat conductivity designed to contact with the work alongside the line being welded, means adapted to press said strips to the work, and another strip of similar metal carried by said bed and adapted to contact with the work on the opposite side thereof from the two first-named strips.

39. In arc-welding mechanism, the combination of a bed for supporting the work, an electrode and holder therefor movable relatively to said bed in a longitudinal direction, two strips of metal having a relatively high heat conductivity designed to contact with the work alongside the line being welded, means adapted to press said strips to the work, and another strip of similar metal carried by said bed and adapted to contact with the work on the opposite side thereof from the two first-named strips, the latter being arranged and constructed partially to overlie the third strip.

40. In arc-welding mechanism, the combination of a bed for supporting the work, an electrode and holder therefor movable relatively to said bed in a longitudinal direction, two strips of metal having a relatively high heat conductivity designed to contact with the work alongside the line being welded, bars mounted on said strips, respectively, for pressing the same to the work, and another strip of similar metal carried by said bed and adapted to contact with the work on the opposite side thereof from the two first-named strips.

41. An electric arc welding apparatus wherein a weld is produced by relative movement between an arc and a work support comprising a backing member, characterized by the fact that said backing member includes a base of magnetic material provided with an inlay of material possessing high heat conductivity along the line of relative movement between said arc and said member, said magnetic base being adapted to engage the work to be welded on each side of said inlay to produce a magnetic circuit of relatively low reluctance through the work and the backing member.

42. An electric arc welding apparatus, wherein a weld is produced by relative movement between the work and an electric arc, provided with a backing member including a steel base with an inlay of copper along the line of said relative movement, said magnetic base being adapted to engage the work to be welded on each side of said inlay to produce a magnetic circuit of relatively low reluctance through the work and the backing member.

43. A backing member for use in electric arc welding comprising a base of magnetic material and an inlay of material possessing high heat conductivity along the line of the weld, said magnetic base being adapted to engage the work to be welded on each side of said inlay to produce a magnetic circuit of relatively low reluctance through the work and backing member.

44. In metal working by electricity, the steps which consist in establishing an arc between the work and a suitable electrode, relatively moving such work and electrode to cause the latter to follow the line to be welded, and surrounding such arc with a closed flux circuit.

45. In metal working by electricity, the steps which consist in establishing an arc between the work and a suitable electrode, relatively moving such work and electrode to cause the latter to follow the line to be welded, and surrounding such arc with a relatively stationary closed flux circuit.

46. The method of electric arc welding which comprises adjustably controlling the angular relation of the arc to the work by directing the flow of welding current from a plurality of spaced points arranged relatively to the arc so that such flow of current through the work or its support in angular relation to the axis of the electrode produces the desired directional effect on the arc.

47. In arc welding mechanism, the combination of a welding electrode adapted to be presented in arcing relation to the work and moved relatively thereto along the line to be welded, a conductor for welding current having contact with the work or its support, and a bar of metal disposed alongside and substantially parallel with the path of travel of the arc, said bar having such a degree of heat conductivity and extending away from the work in such close and unvarying proximity to such arc as to restrain the tendency of such arc to wander to the corresponding side of such line of travel.

48. In arc welding mechanism, the combination of a welding electrode adapted to be presented in arcing relation to the work and moved relatively thereto along the line to be welded, a conductor for welding current having contact with the work or its support, and a bar of metal disposed on each side and substantially parallel with the path of travel of the arc, said bars having such a degree of heat conductivity and extending away from the work in such close and unvarying proximity to such arc as to restrain the tendency of such arc to wander to either side of such line.

49. The method of electric arc welding which comprises adjustably controlling the angular relation of the arc to the work by directing the flow of welding current from a plurality of points through the work or its support in angular relation to the axis of the electrode, and varying the amount of current flow from at least one of said points.

Signed by me, this 11th day of June, 1931.

JAMES F. LINCOLN.